US012699620B2

(12) United States Patent
Ben-Moshe et al.

(10) Patent No.: US 12,699,620 B2
(45) Date of Patent: Aug. 4, 2026

(54) POST-MORTEM CRASH ANALYSIS FOR ACCELERATED PROCESSORS

(71) Applicants:Advanced Micro Devices, Inc., Santa Clara, CA (US); ATI Technologies ULC, Markham (CA)

(72) Inventors: Amit Ben-Moshe, Boxborough, MA (US); Christopher Cenotti, Boxborough, MA (US); Michael Lee Grossfeld, Boxborough, MA (US); Serguei Sagalovitch, Markham (CA); Budirijanto Purnomo, Boxborough, MA (US)

(73) Assignees: Advanced Micro Devices, Inc., Santa Clara, CA (US); ATI Technologies ULC, Ontario (CA)

( * ) Notice: Subject to any disclaimer, the term of this patent is extended or adjusted under 35 U.S.C. 154(b) by 0 days.

(21) Appl. No.: 18/621,554

(22) Filed: Mar. 29, 2024

(65) Prior Publication Data
US 2025/0307058 A1 Oct. 2, 2025

(51) Int. Cl.
*G06F 11/07* (2006.01)
(52) U.S. Cl.
CPC .................................. *G06F 11/079* (2013.01)
(58) Field of Classification Search
CPC ...................................................... G06F 11/079
See application file for complete search history.

(56) References Cited

U.S. PATENT DOCUMENTS

| | | | | |
|---|---|---|---|---|
| 8,522,000 B2 * | 8/2013 | Shebanow | ............ | G06F 9/3888 |
| | | | | 712/225 |
| 10,922,203 B1 * | 2/2021 | Alben | ........................ | G06F 1/04 |
| 11,074,075 B2 * | 7/2021 | Fowler | .................. | G06F 9/3834 |
| 11,188,407 B1 * | 11/2021 | Swanson | ............. | G06F 11/1435 |
| 12,204,417 B2 * | 1/2025 | Tonry | .................. | G06F 11/1469 |
| 2009/0307403 A1 * | 12/2009 | Rangarajan | ............. | G06F 13/24 |
| | | | | 710/104 |
| 2013/0346800 A1 * | 12/2013 | Gulati | ..................... | G06F 11/27 |
| | | | | 714/E11.17 |
| 2015/0277968 A1 * | 10/2015 | Gottschlich | ............. | G06F 9/467 |
| | | | | 717/134 |
| 2019/0272206 A1 * | 9/2019 | Tsai | ..................... | G06F 11/0706 |

* cited by examiner

*Primary Examiner* — Jigar P Patel
(74) *Attorney, Agent, or Firm* — Volpe Koenig

(57) ABSTRACT

A computing device and a method of performing crash analysis is provided. Each compute unit of an accelerated processor is configured to execute an application in a crash analysis operation mode, different from a normal operation mode, by executing a single instruction in isolation from any other instruction such that execution of the single instruction is completed prior to beginning execution of any of the other instructions. Examples of selectable crash analysis operation modes include a first mode in which execution of each memory instruction is completed prior to beginning execution of a next instruction, a second mode in which execution of each ALU instruction is completed prior to beginning execution of a next instruction, and a third mode in which execution of both memory and ALU instructions are completed prior to beginning execution of a next instruction.

20 Claims, 4 Drawing Sheets

POST-MORTEM CRASH ANALYSIS FOR ACCELERATED PROCESSORS

BACKGROUND

Accelerated processors are used to execute an application by processing a large amount of different tasks of the application in parallel with each other to speed up execution of the application. Accelerated processors are used to execute a wide range of applications types, such as graphics related applications, artificial intelligence applications, virtual reality applications.

BRIEF DESCRIPTION OF THE DRAWINGS

A more detailed understanding can be had from the following description, given by way of example in conjunction with the accompanying drawings wherein.

DETAILED DESCRIPTION

Figure 1:
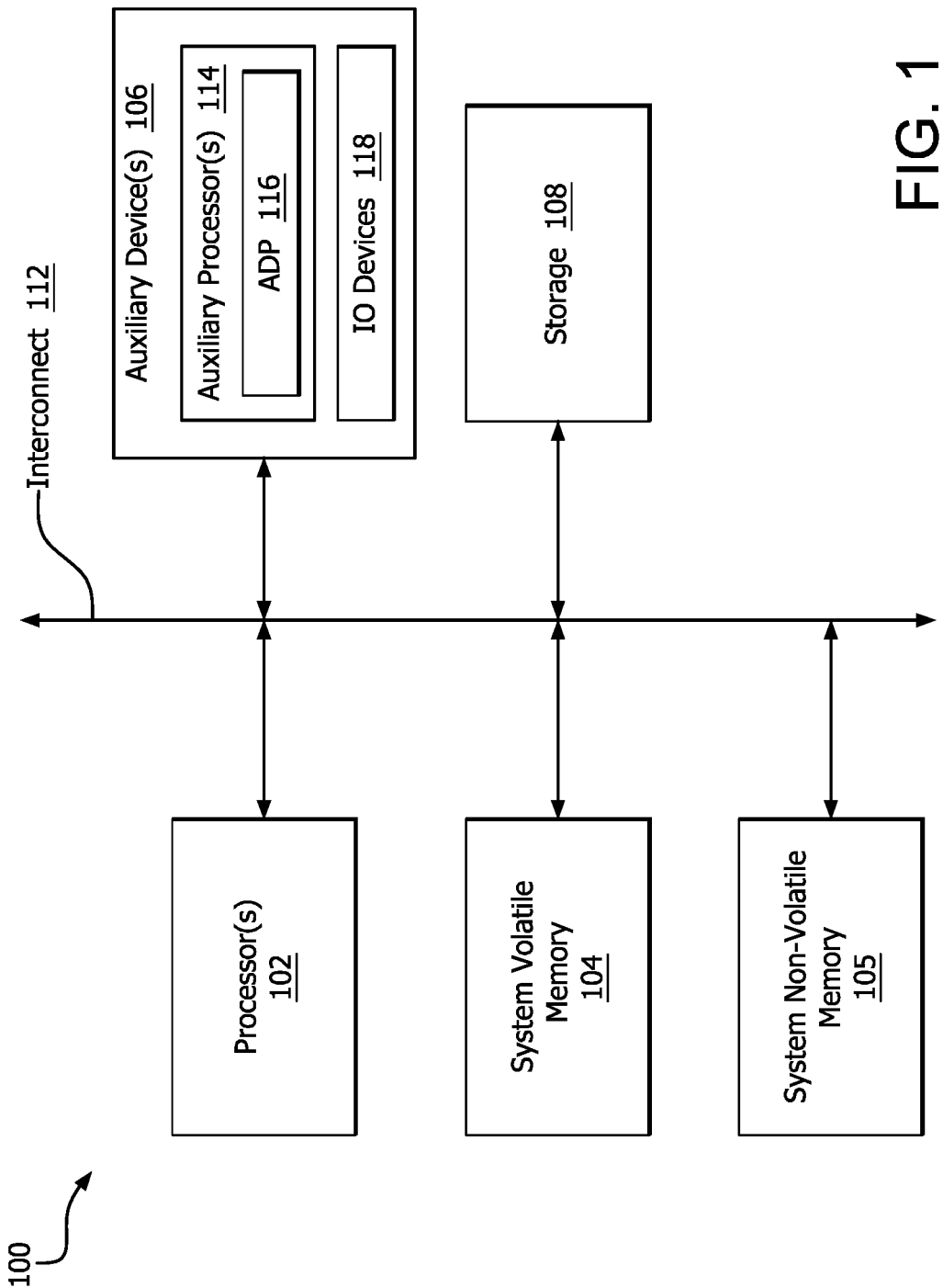
FIG. 1 is a block diagram of an example computing device in which one or more features of the present disclosure can be implemented.

One example of an accelerated processor is a graphics processing unit (GPU) which is typically used for graphics and video rendering. For simplified explanation, features of the present disclosure are described, in some examples, as analyzing a crashing application executing on a GPU. However, features of the present disclosure can be implemented for analyzing a crashing application executing on any accelerated processor or accelerated processing device which includes separate processors to execute instructions in parallel (e.g., massively parallel processing) to speed up execution of the application.

The CPU submits commands (e.g., streams of instructions) to be executed on the GPU. A GPU driver controls operation of the GPU by providing an application programming interface (API) to the executing application to access various functionality of the GPU. The application submits commands for execution on the GPU using the API. The API includes runtime software that passes these commands to the GPU driver, which then passes the commands in a more low-level format to the operating system (OS). The OS then passes the commands to a kernel mode driver which, in turn, issues instructions for execution by the hardware (e.g., compute units) of the GPU. The GPU then executes the application by executing the instructions.

In some cases, an application crashes while executing on an accelerated processor (e.g., GPU) of a computing device. The OS tracks commands issued to the GPU and their execution on the GPU. When a command does not complete execution, after a period of time (or a number of clock cycles) from when the command is issued (e.g., due to an infinite loop in a shader), the command times out and an error occurs. In this case, the GPU appears non-responsive and the CPU is notified of the error. The CPU then usually terminates execution of the application. On the condition that a command has timed out, the command can be pre-empted by the CPU, via the driver, and execution continues. If the command cannot be preempted, the CPU then terminates execution of the application. Alternatively, the CPU can become aware of an error, such as a memory fault, by receiving an error code or an exception disrupting the normal flow of execution.

Analyzing crashes executed on an accelerated processor (e.g., GPU) can be challenging due to the massively parallel nature of the accelerated processor. For example, the reason or cause of a crash is more efficiently and reliably determined when the GPU work that triggered the crash is the last work performed in the analysis process. However, some errors (e.g., memory faults) do not trigger a crash during a GPU's normal operation mode or only trigger a crash on some GPUs (e.g., GPU versions or types) but not on other GPUs.

Due to the parallel nature of a GPU execution and its interaction with the OS, there is typically a gap between a time when a computing device becomes aware of a crash occurring and a time when a computing device intervenes to identify the potentially offending portion of a program (e.g., offending work performed by the GPU). This gap in time allows work to flow throughout the GPU pipeline, which can make it extremely difficult or virtually impossible to identify the portion of a program that was executing in the moments leading up to the crash. Moreover, since GPUs execute many instructions in parallel, even if all of the executing work at the time of the crash is known, identifying the offending portion of a program (e.g., one or more instructions, a work-item or thread, a wavefront or warp, or other portion of a program) is extremely difficult or impossible in many cases.

That is, during a GPU's normal operation mode, if the GPU hardware (e.g., compute units or processing cores) continues execution for work that is unrelated to the crash during the time between when the GPU stops responding to the OS and the time of the crash, then "noise" (i.e., GPU work that is not a potential cause of the crash) is added to the analysis data such that the GPU work that triggered the crash is not the last work performed in the analysis process, making it more difficult to accurately determine or identify the cause of the crash.

Some conventional crash analysis techniques collect information about memory transactions and insert execution markers into the application code to provide an indication of which portion of the application was executing when the application crashed for high-level pass analysis. The markers are either inserted by an analyzer (e.g., a developer or other person which performs crash analysis) into application code or inserted by the driver stack or the GPU into the command stream to mark/identify when commands started executing and finished executing.

Other conventional crash analysis techniques configure hardware specifically for live debugging of compute only instructions and, therefore, are not accurate and reliable in analyzing crashes.

Features of the present disclosure provide devices and methods for accurately and reliably identifying an offending portion of a program in the context of post-mortem crash analysis. Features of the present disclosure improve the accuracy of a post-mortem crash analysis solution by executing instructions of an application on the accelerated processor hardware (e.g., on a SIMD unit of a compute unit of a GPU) in a crash analysis operation mode, different from a normal GPU operation mode, specifically to perform crash analysis. In crash analysis mode, instructions (e.g., memory instructions and arithmetic logic unit (ALU) instructions) are executed in isolation from each other such that execution of an instruction is completed prior to beginning execution of a next instruction to provide more accurately and reliably analyze crashes.

For example, during execution of a crashing application in crash analysis mode, each error (e.g., memory error) is identified, including errors that would otherwise not trigger a crash during normal GPU operation mode. The GPU hardware (e.g., compute units) is configured to crash (e.g., stop executing) on the condition of the occurrence of each error during execution of the crashing application. That is, in the case of an error (e.g., a memory fault) occurring, the GPU halts its execution, enabling the offending portion of an application and the specific assembly instruction that triggered the crash to be identified. Accordingly, crash information closest to the point of crash (and not beyond the point of crash) can be collected and provided (e.g., to a developer) to more efficiently identify one or more causes of a crash.

In crash analysis mode, an instruction (e.g., memory instruction, ALU instruction or both memory and ALU instructions) is executed on a SIMD unit of a compute unit, such that the execution of other instructions (e.g., no other memory instruction or ALU instruction) on the SIMD unit do not overlap with the execution of the instructions on the SIMD unit. Each SIMD unit is configured to complete execution of a single instruction (e.g., memory instruction, ALU instruction or both memory and ALU instructions) in isolation from any other instruction (e.g., memory instruction or ALU instruction) such that execution of the single instruction is completed before beginning executing of a next instruction.

For example, in a first crash analysis operation mode, each compute unit is configured to complete execution of a memory instruction, on a SIMD unit, prior to beginning execution of a next instruction (e.g., a next memory instruction or a next ALU instruction). Alternatively, in a second crash analysis operation mode, each compute unit is configured to complete execution of an ALU instruction, on a SIMD unit, prior to beginning execution of a next instruction (e.g., a next memory instruction or a next ALU instruction). Alternatively, in a third crash analysis operation mode, each compute unit is configured to complete execution of a memory instruction, on a SIMD unit, prior to beginning execution of a next instruction (e.g., a next memory instruction or a next ALU instruction) and complete execution of an ALU instruction, on a SIMD unit, prior to beginning execution of a next instruction (e.g., a next memory instruction or a next ALU instruction).

During execution of a crashing application in crash analysis mode, each compute unit is, for example, also configured to wait for all dependency counters to indicate an instruction is not dependent on data resulting from the execution of another instruction (e.g., reach a count of zero) before executing a next instruction.

Accordingly, execution of the application in crash analysis operation mode provides (e.g., to a developer) more accurate and reliable information than normal operation mode which is used (e.g., by the developer) to more efficiently identify the causes of a crashing application across multiple runs of the application and facilitate predictable behavior of the crashing application across different GPUs (e.g., different versions or types of GPUs).

A computing device for performing crash analysis of an application is provided which comprises memory and an accelerated processor, in communication with the memory. The accelerated processor comprises a plurality of compute units, each compute unit configured to execute an instruction by at least one of: completing execution of a memory instruction prior to beginning execution of a next memory instruction; completing execution of an arithmetic logic unit (ALU) instruction prior to beginning execution of a next ALU instruction; or complete execution of a memory instruction prior to beginning execution of a next memory instruction and completing execution of an ALU instruction prior to beginning execution of a next ALU instruction.

A computing device for performing crash analysis of an application is provided which comprises memory and an accelerated processor, in communication with the memory. The accelerated processor comprises a plurality of compute units, and is configured to execute the application in a normal mode by executing instructions for an instruction in parallel with each other; and execute the application in a crash analysis mode by executing each instruction for the instruction in isolation from any other instruction for the instruction.

A computing device for performing crash analysis is provided. The computing device comprises memory and an accelerated processor, in communication with the memory. The accelerated processor comprises a plurality of compute units, each compute unit configured to execute an application in: a first crash analysis operation mode by completing execution of each memory instruction prior to beginning execution of a next instruction; a second crash analysis operation mode by completing execution of each arithmetic logic unit (ALU) instruction prior to beginning execution of a next instruction; or a third crash analysis operation mode by completing execution of each memory instruction prior to beginning execution of a next instruction and completing execution of each ALU instruction prior to beginning execution of a next instruction.

A computing device for performing crash analysis for an application is provided. The computing device comprises memory and an accelerated processor. The accelerated processor is in communication with the memory and comprises a plurality of compute units having SIMD units. Each compute unit is configured to execute the application in a crash analysis mode by: executing, on a SIMD unit, a single instruction in isolation from any other instruction such that execution of the single instruction is completed prior to beginning execution of any of the other instructions.

A method of performing crash analysis on an accelerated processing device, is provided which comprises executing an application in one of a plurality of crash analysis operation mode. The plurality of crash analysis operation modes comprises a first crash analysis operation mode in which execution of each memory instruction is completed prior to beginning execution of a next instruction; a second crash analysis operation in which execution of each arithmetic logic unit (ALU) instruction is completed prior to beginning execution of a next instruction; and a third crash analysis operation mode in which execution of each memory instruction is completed prior to beginning execution of a next instruction and in which execution of each ALU instruction is completed prior to beginning execution of a next instruction. The method also comprises generating crash analysis information, over time, during execution of the application.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory including system volatile memory 104 and system non-volatile memory 105, one or more auxiliary devices 106 and storage 108. An interconnect 112, which can be a bus, a combination of buses, and/or any other communication component, communicatively links the processor(s) 102, system volatile memory 104, system non-volatile memory 105, the auxiliary device(s) 106 and the storage 108.

In various alternatives, the processor(s) 102 include a central processing unit (CPU), a graphics processing unit (GPU), a CPU and GPU located on the same die, or one or more processor cores, wherein each processor core can be a CPU, a GPU, or a neural processor. In various alternatives, at least part of the system volatile memory 104 and system non-volatile memory 105 is located on the same die as one or more of the processor(s) 102, such as on the same chip or in an interposer arrangement, and/or at least part of system volatile memory 104 and system non-volatile memory 105 is located separately from the processor(s) 102. The system volatile memory 104 includes, for example, random access memory (RAM), dynamic RAM, or a cache. The system non-volatile memory 105 includes, for example, read only memory (ROM).

The storage 108 includes a fixed or removable storage, for example, without limitation, a hard disk drive, a solid state drive, an optical disk, or a flash drive. The auxiliary device(s) 106 include, without limitation, one or more auxiliary processors 114, and/or one or more input/output ("IO") devices. The auxiliary processor(s) 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116. In addition, although processor(s) 102 and APD 116 are shown separately in FIG. 1, in some examples, processor(s) 102 and APD 116 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
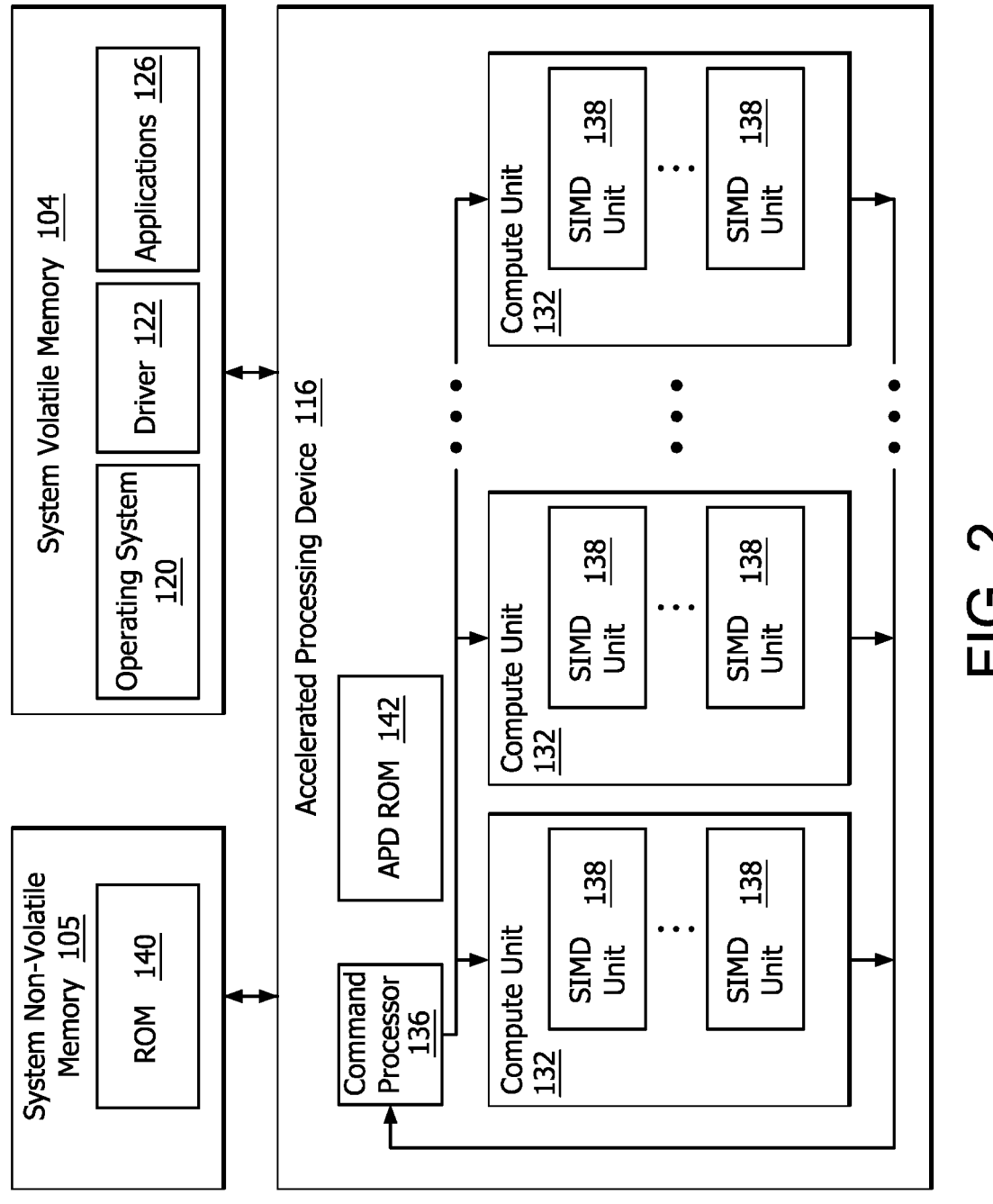
FIG. 2 is a block diagram of the computing device shown in FIG. 1, illustrating additional details related to execution of processing tasks on the accelerated processing device, according to an example.

FIG. 2 is a block diagram of the computing device 200 shown in FIG. 1, illustrating additional details related to execution of processing tasks on the APD 116, according to an example.

As described in more detail below, the APD 116 is configured to execute an application (e.g., crashing application) in both a normal operation mode which executes instructions on a SIMD unit in parallel with each other and a crash analysis mode which executes instructions (e.g., memory instructions, ALU instructions or both memory instructions and ALU instructions) on a SIMD unit in isolation from any other instruction to more accurately and reliably analyze crashes.

The processor 102 maintains, in system volatile memory 104, one or more control logic modules for execution by the processor 102. The control logic modules include an operating system 120, a driver 122, and applications 126, and may optionally include other modules not shown. These control logic modules control various aspects of the operation of the processor(s) 102 and the APD 116. For example, the operating system 120 directly communicates with hardware and provides an interface to the hardware for other software executing on the processor(s) 102. The driver 122 controls operation of the APD 116 by, for example, providing an API to software (e.g., applications 126) executing on the processor(s) 102 to access various functionality of the APD 116. The driver 122 also includes a just-in-time compiler that compiles shader code into shader programs for execution by processing components (such as the SIMD units 138 discussed in further detail below) of the APD 116. The processor 102 also includes non-volatile memory 105, such as for example, ROM 140. As shown in FIG. 2, APD 116 also includes APD ROM 142 as non-volatile memory.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to a display device (e.g., one of the IO devices 118) based on commands received from the processor(s) 102. The APD 116 also executes compute processing operations that are not directly related to graphics operations, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to execute instructions to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A command processor 136 is configured to execute instructions to perform operations related to scheduling various wavefronts on different compute units 132 and SIMD units 138.

The parallelism afforded by the compute units 132, during a normal mode of operation, is suitable for graphics related operations such as pixel value calculations, vertex transformations, tessellation, geometry shading operations, and other graphics operations. A graphics processing pipeline 134 which accepts graphics processing commands from the processor(s) 102 thus provides computation tasks to the compute units 132 for execution in parallel.

The compute units 132 are also used to perform computation tasks not related to graphics or not performed as part of the operation of a graphics processing pipeline 134 (e.g., custom operations performed to supplement processing performed for operation of the graphics processing pipeline 134). An application 126 or other software executing on the processor(s) 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134.

As described in more detail below, the APD 116 is configured to operate in both a normal GPU operation mode and a crash analysis GPU operation mode. In normal operation mode, the compute units 132 of the APD 116 are configured to execute, on each SIMD unit 138, instructions in parallel except when execution of an instruction is dependent on data resulting from execution of another instruction to speed up execution of an application 126. In contrast, when analyzing the cause of a crashing application, the goal is to facilitate a more efficient identification of the cause of the crash instead of speeding up execution of the application 126.

Figure 3:
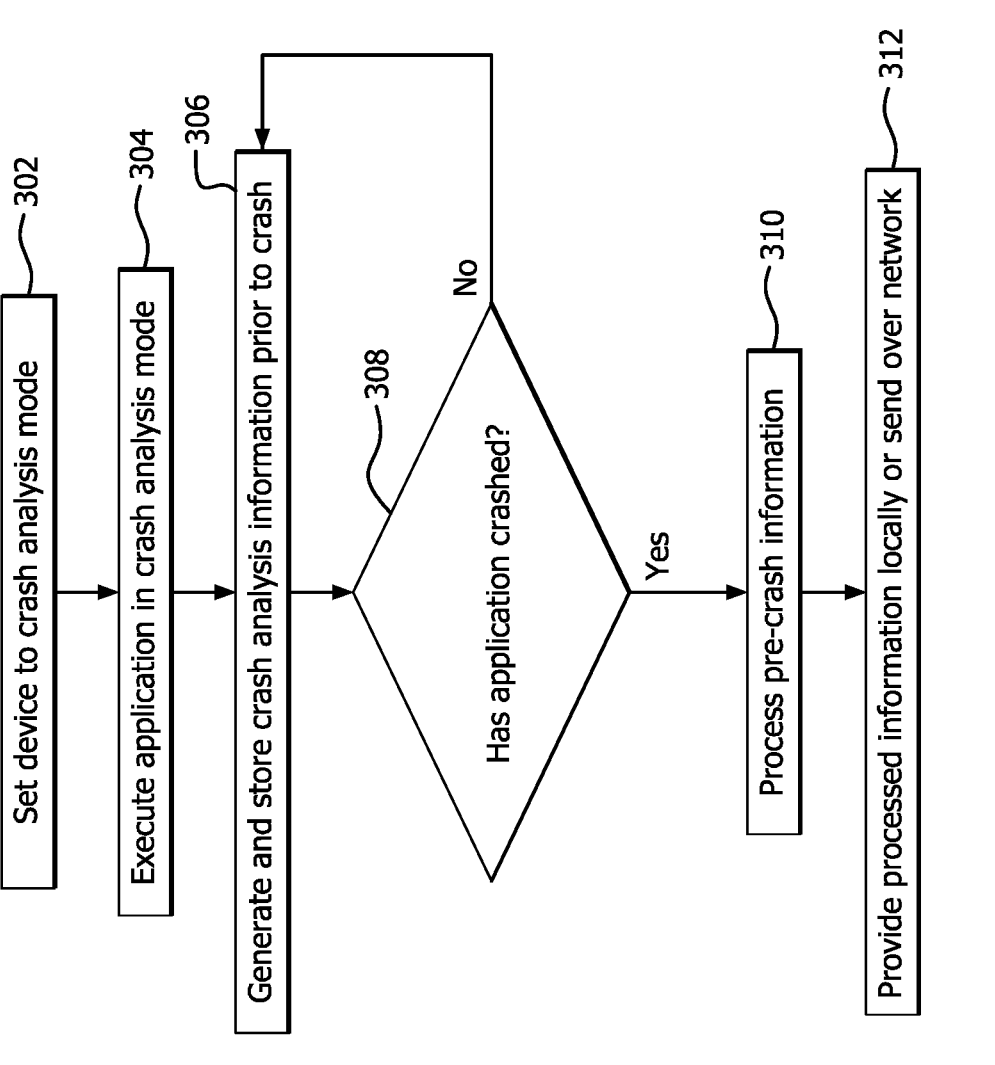
FIG. 3 is an flow diagram illustrating an example method of analyzing a crashing application executing on the accelerated processing device according to features of the present disclosure.

Accordingly, in crash analysis mode, each SIMD unit 138 is configured to complete execution of a single instruction (e.g., memory instruction, ALU instruction or both memory and ALU instructions) in isolation from any other instruction (e.g., memory instruction or ALU instruction) such that execution of the single instruction is completed before beginning executing of a next instruction FIG. 3 is a flow diagram illustrating an example method 300 of analyzing a crashing application executing on an accelerated processing device. For simplified explanation, in the example method 300 described below, the accelerated processing device is a GPU. However, the method 300 of analyzing a crashing application described below can be implemented for analyzing a crashing application executing on any accelerated processor or accelerated processing device in which a large amount of tasks are processed in parallel (e.g., massively parallel processing) to speed up execution of the application.

As shown at block 302, the method 300 includes setting the GPU (e.g., APD 116) to crash analysis operation mode. The GPU is set to crash analysis operation mode, by the CPU via user input, using software configured to customize GPU performance settings.

For example, an analyzer may be prompted to select between: (1) a first crash analysis operation mode, in which each compute unit is configured to complete execution of a memory instruction, on a SIMD unit, prior to beginning execution of a next instruction (e.g., a next memory instruction or a next ALU instruction); (2) a second crash analysis operation mode, in which each compute unit is configured to complete execution of an ALU instruction, on a SIMD unit, prior to beginning execution of a next instruction (e.g., a next memory instruction or a next ALU instruction); and (3) a third crash analysis operation mode, in which each compute unit is configured to complete execution of a memory instruction, on a SIMD unit, prior to beginning execution of a next instruction (e.g., a next memory instruction or a next ALU instruction) and complete execution of an ALU instruction, on a SIMD unit, prior to beginning execution of a next instruction (e.g., a next memory instruction or a next ALU instruction).

A developer can select any one of these modes, as the crash analysis mode, based on a variety of factors, such as runtime performance and reproducibility of the crash.

With regard to runtime performance, reproducing the crash reliably and easily can be an important factor for choosing a crash analysis operation mode. The third crash analysis operation mode typically has a larger impact on runtime performance and executes slower than the first and second crash analysis operation modes. In addition, the second crash analysis operation mode typically has a larger impact on runtime performance and executes slower than the first crash analysis operation mode because there are typically more ALU instructions to execute than memory instructions.

Accordingly, for applications which do not crash until a long period of time after the application starts executing (e.g., 30 minutes or longer), an analyzer (e.g., developer) may select the first or second crash analysis operation modes because they execute more quickly than the third crash analysis operation mode and, therefore, will result in the crash occurring more quickly after beginning execution of the application. An analyzer may also select the first or second crash analysis operation modes for applications, (e.g., game applications) in which a crash occurs when certain moves are performed in response to specific actions occurring during the game. That is, an analyzer may select the mode with the least impact on runtime performance to reproduce the crash in an environment that is closer to actual game play.

With regard to reproducibility of the crash, crashes for some applications may not be reproducible when executing in one or more of the crash analysis operation modes. For example, a crash may not be reproduced when executing an application in the third crash analysis operation mode, but is reproduced when executing the application in the first or second crash analysis operation modes. In addition, an analyzer may need to experiment with executing the application using one or more of the different crash analysis operation modes to determine if a crash is reproducible when using a particular crash analysis operation mode.

The factors for choosing one of the modes can vary across different devices (e.g., different accelerated processors) due to the hardware, software or both hardware and software of a device. Accordingly, in some cases analyzers may choose to start with the first mode, and if execution in the first mode is not producing accurate results, the analyzer may progress to the second mode and then the third mode. In other cases, general details of the crash can impact the decision by the analyzer. For example, if an analyzer is aware that a crash was not caused by a page fault, the analyzer can select the second mode and not the first or third modes.

Providing each of these modes as selectable choices for an analyzer offers more flexibility to analyzers for managing the tradeoffs of runtime performance and reproducibility of the crash.

Based on the selection, GPU is set to one of the first crash analysis operation mode, the second crash analysis operation mode or the third crash analysis operation mode to execute the application.

The GPU can be set to a crash analysis operation mode by switching the mode of operation from normal operation mode or a non-selected one of the first, second, or third crash analysis operation mode to the selected crash analysis operation mode. Alternatively, block 302 may be skipped if the GPU is already set to the crash analysis operation mode which is to be used.

As shown at block 304, the method 300 includes executing the crashing application (e.g., application reported as a crashing application) in crash analysis operation mode. For example, based on the selection, the CPU submits commands (e.g., streams of instructions) to be executed on the GPU using the selected one of the first, second or third crash analysis operation modes. The OS then passes the commands to a kernel mode driver which, in turn, issues instructions for execution by the hardware (e.g., compute units) of the GPU. The GPU then executes the application by executing the instructions. The GPU then begins executing the application using the selected one of the first, second or third crash analysis operation modes.

That is, the crashing application executes in crash analysis mode and crash analysis information is generated and stored (e.g., in any portion of memory or storage) by at block 306, over time (e.g., at different intervals, prior to execution of each instruction, or after execution of each instruction), until a crash occurs. The crash analysis information is typically tracked and stored by the CPU. However, some crash analysis information (e.g., time stamp information) can be generated by the GPU.

The crash analysis information includes, for example, at least one of: a state of registers local to each compute unit (e.g., data stored in local memory; a state of memory local to each compute unit (data stored in local cache memory); each instruction issued for execution; virtual addresses assigned to the application; and how memory is being used (e.g., as a render target, a buffer or other use). The crash analysis information is raw or pre-processed information, that is generated and stored (e.g., in volatile memory) over time and is later processed and stored (e.g., in non-volatile memory) in a format (e.g., as a summary file) which can be used by the analyzer to more efficiently determine the reason for the crash.

As shown at decision block 308, the method 300 includes determining whether or not the application has crashed.

As described above, the compute units 132 are configured to stop executing in response to the occurrence of any error occurring during execution of an application. For example, as described above, an error can occur due to a command timing out or another type of error, such as a memory fault. Accordingly, on the condition of any error occurring, the compute units 132 are configured to halt their execution. When the GPU (i.e., compute units 132 of APD 116) is no longer responsive, the GPU driver 122 notifies the CPU (e.g., processor 102) via OS 120, that a first error has occurred. Based on the notification, the CPU determines that the application has crashed and execution of the application terminates.

On a condition that the application has not crashed ("No" decision), the application continues executing and the crash analysis information continues to be generated and stored at block 306.

On a condition that the application has crashed ("Yes" decision), the crash analysis information is processed, at block 310, by the CPU into a format which can be used (e.g., by a developer) to more efficiently determine the reason for the crash (e.g., processed and stored in a summary file format).

In an example, the crash analysis information is stored by the CPU in in a summary file format. The stored crash analysis information can then be accessed and analyzed (e.g., by a developer). The processed crash analysis information is, for example, stored in summary file format, in non-volatile memory. However, it should be understood that the crash analysis information can be stored in any memory and in any format that allows a developer to access and analyze the information.

The crash analysis information (e.g., summary file) is then either provided locally (e.g., displayed on a display device at the computing device) to an analyzer or sent over a network to one or more remote devices, at block 312, where the crash analysis information can then, for example, be displayed at the remote devices.

Figure 4:
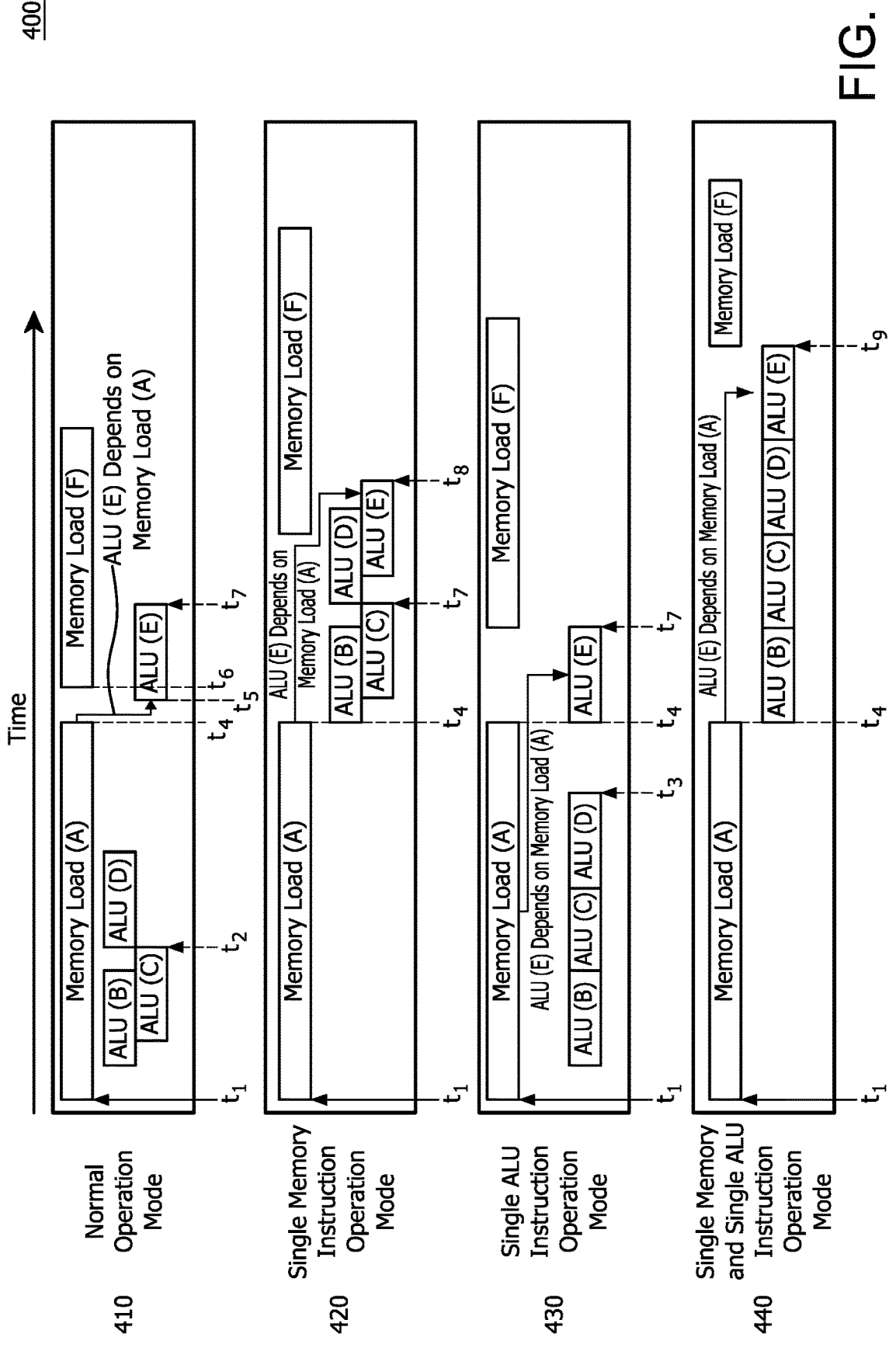
FIG. 4 shows timing diagrams illustrating a comparison of executing instructions on an accelerated processing device during a normal operation mode and executing the instructions during each of three different crash-analysis operation modes, according to features of the present disclosure.

FIG. 4 shows timing diagrams 400 illustrating a comparison of executing instructions, on a SIMD unit of a compute unit of a GPU, during a normal mode of GPU operation and executing the instructions during each of three different crash-analysis operation modes. As shown in the timing diagrams 400, the instructions can comprise memory instructions and/or ALU instructions.

It should be understood that the issued instructions can be executed across any number of SIMD units of a compute unit. However, for simplified explanation purposes, the timing diagrams 400 in FIG. 4 illustrate instructions executed on a single SIMD unit.

It should also be understood that the instructions can be executed in parallel or serially. The instructions can be executed in parallel using any one or a number of different ways that allows for the processing of different instructions to occur concurrently. This is because the GPU can employ instruction level parallelism where different instructions, like memory instructions and ALU instructions, are executed in parallel provided the instructions are independent and there are sufficient resources.

Also, there is a typically a small period of time between when an instruction is issued and when an instruction begins executing. However, for simplified explanation purposes, a single point in time is used in FIG. 4 to illustrate when an instruction is issued and begins executing.

The first timing diagram 410 (top diagram) in FIG. 4 illustrates an example of execution of issued instructions on a SIMD unit (e.g., SIMD unit 138 in FIG. 2) of a compute unit (e.g., a compute unit 132 in FIG. 2) in normal GPU operation mode.

As shown in the first timing diagram 410, a memory instruction (Memory Load (A)) begins executing at time $t_1$. That is, Memory Load (A) instruction is issued to a compute unit to read data from memory (e.g., local cache memory or RAM) and load the data to registers assigned to the compute unit. ALU(B) and ALU(C) instructions are also issued to perform arithmetic operations. Because the execution of ALU(B) and ALU(C) instructions are not dependent on data resulting from the execution of Memory Load (A) instruction, ALU(B) and ALU(C) instructions are executed, in parallel on the SIMD unit, with Memory Load (A) instruction. Also, a portion of ALU(B) instruction is executed in parallel with ALU(C) instruction. In addition, because ALU (D) instruction is not dependent on data resulting from the execution of Memory Load (A) instruction, ALU(D) instruction also begins executing in parallel with Memory Load (A) instruction when ALU(C) instruction completes execution at time $t_2$.

Accordingly, because some memory and ALU instructions are executed in parallel, if a crash occurs during execution of the instruction, it may be very difficult to identify the portion of the instruction (e.g., one of the ALU instructions) which caused the crash due to the gap in time between when the computing device becomes aware of the crash and a time when a computing device intervenes to identify the potentially offending portion of a program (e.g., offending work performed by the GPU). For example, if the error and cause of the crash occurred during execution of one of the ALU instructions ALU(B) or ALU(C), by the time execution is halted, it can be difficult to determine whether ALU(B) or ALU(C) instruction was the offending portion of the program which caused the crash.

As described above, the GPU can be set to a crash analysis operation mode to improve the accuracy of a post-mortem crash analysis solution. In crash analysis operation mode, instructions of an application are executed on the accelerated processor hardware (e.g., on a SIMD unit of a compute unit of a GPU) different from a normal GPU operation mode, specifically to perform crash analysis. In crash analysis mode, instructions (e.g., memory instructions and arithmetic logic unit (ALU) instructions) are executed in isolation from each other such that execution of an instruction is completed prior to beginning execution of a next instruction to provide more accurately and reliably analyze crashes.

As described above, the GPU can be set to one of a plurality of different crash analysis operation modes. For example, the GPU can be set to one of a first crash analysis operation mode, a second crash analysis operation mode, or a third crash analysis operation mode. For example, a developer may be prompted to select between: (1) a first crash analysis operation mode, in which each compute unit is configured to complete execution of a memory instruction, on a SIMD unit, prior to beginning execution of a next instruction (e.g., a next memory instruction or a next ALU instruction); (2) a second crash analysis operation mode, in which each compute unit is configured to complete execution of an ALU instruction, on a SIMD unit, prior to beginning execution of a next instruction (e.g., a next memory instruction or a next ALU instruction); and a third crash analysis operation mode, in which each compute unit is configured to complete execution of a memory instruction, on a SIMD unit, prior to beginning execution of a next instruction (e.g., a next memory instruction or a next ALU instruction) and complete execution of an ALU instruction, on a SIMD unit, prior to beginning execution of a next instruction (e.g., a next memory instruction or a next ALU instruction).

Examples of executing these different crash analysis operation modes are now described with reference to the second, third and fourth timing diagrams shown in FIG. 4.

The second timing diagram 420 (second diagram from the top) in FIG. 4 illustrates an example of executing the issued instructions in the first crash analysis operation mode in which each compute unit is configured to complete execution of a memory instruction, on a SIMD unit, prior to beginning execution of a next instruction (e.g., a next memory instruction or a next ALU instruction).

As shown in the second timing diagram 420, the same memory instruction (Memory Load (A)) begins executing at time $t_1$. However, in contrast to the first timing diagram in normal operation mode, none of the ALU instructions (ALU (B), ALU(C), ALU(D) or ALU(E)) begin executing until Memory Load (A) instruction completes execution at time $t_4$. ALU(C) finishes executing at time $t_7$ and ALU(E) finishes executing at time $t_0$. That is, while portions of the ALU instructions are executed in parallel with each other and in parallel with Memory Load (B) instruction, the execution of any memory instruction is completed, on a SIMD unit, prior to beginning execution of any next instruction (e.g., next memory instruction or next ALU instruction).

Because the application crashes upon any error occurring, if the error occurs during the execution of Memory Load (A) instruction, a developer can dismiss the ALU instructions (ALU(B), ALU(C), ALU(D) or ALU(E)) as a cause of the crash because the error occurred prior to any of the ALU instructions beginning their execution. The developer can dismiss the ALU instructions as the cause of the crash using the crash analysis information generated and provided to the developer (e.g., in the summary file format) indicating that the error occurred during the execution of Memory Load (A) instruction and prior to any of the ALU instructions beginning their execution.

The third timing diagram 430 in FIG. 4 illustrates an example of executing the issued instructions in the second crash analysis operation mode in which each compute unit is configured to complete execution of an ALU instruction, on a SIMD unit, prior to beginning execution of a next instruction (e.g., a next memory instruction or a next ALU instruction).

As shown in the third timing diagram 430, the same memory instruction (Memory Load (A)) begins executing at time $t_1$. However, in the second crash analysis operation mode, none of the ALU instructions (ALU(B), ALU(C), ALU(D) or ALU(E)) are executed in parallel with each other. That is, ALU(C) begins executing when ALU(B) finishes executing and ALU(D) begins executing when ALU(C) finishes executing. ALU(D) then finishes executing at time $t_3$. However. ALU(E) does not begin executing ALU(C) finishes executing at time $t_7$. Instead, ALU(E) begins executing at time $t_4$ when Memory Load (A) finishes executing (because ALU(E)'s execution is dependent on data resulting from the execution of Memory Load (A) instruction). Then, Memory Load (F) instruction begins executing when ALU(E) finishes executing at time $t_7$.

Because the application crashes upon any error occurring, if for example, the error occurs during the execution of ALU(B), then the developer can dismiss the ALU instructions (ALU(C), ALU(D) and ALU(E)) as a cause of the crash because the error occurred prior to any of the ALU instructions beginning their execution. The developer can dismiss the ALU instructions as the cause of the crash using the crash analysis information generated and provided to the developer (e.g., in the summary file format) indicating that the error occurred during the execution of ALU(B) instruction and prior to the ALU(C), ALU(D) and ALU(E) instructions beginning their execution.

The fourth timing diagram 440 in FIG. 4 illustrates an example of executing the issued instructions in the second crash analysis operation mode in which each compute unit is configured to complete execution of a memory instruction, on a SIMD unit, prior to beginning execution of a next instruction (e.g., a next memory instruction or a next ALU instruction) and complete execution of an ALU instruction, on the SIMD unit, prior to beginning execution of a next instruction (e.g., a next memory instruction or a next ALU instruction).

As shown in the fourth timing diagram 440, the same memory instruction (Memory Load (A)) begins executing at time $t_1$. However, in the third crash analysis operation mode, none of the instructions (i.e., Memory Load (A), Memory Load (B), ALU(B), ALU(C), ALU(D), ALU(E)) are executed in parallel with each other. For example, ALU(B) instruction does not begin execution until Memory Load (A) finishes executing at time $t_4$ and Memory Load (A) instruction does not begin execution until ALU(E) instruction finishes executing at time $t_9$.

Because the application crashes upon any error occurring, if for example, the error occurs during the execution of Memory Load (A) instruction, the developer can dismiss all other instructions (i.e., memory instructions and ALU instructions) as a cause of the crash because the error occurred either after they finished executing or prior to their execution beginning. Likewise, if for example the error occurs during the execution of ALU(C) instruction, all other instructions can be dismissed as a cause of the crash because the error occurred either after they finished executing or prior to their execution beginning. The developer can dismiss all other instructions as the cause of the crash using the crash analysis information generated and provided to the developer (e.g., in the summary file format) indicating that the error occurred during the execution of Memory Load (A) instruction and either after other instructions finished executing or prior to the other instructions beginning their execution.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device for performing crash analysis, the computing device comprising:
   a memory storing application instructions; and
   an accelerated processor, in communication with the memory, the accelerated processor comprising a plurality of compute units, each compute unit configured to execute the application instructions in a regular mode for regular parallel execution of the application instructions; and in a crash-analysis operation mode entered before the application instructions are dispatched,
   wherein when in the crash-analysis operation mode, each of the plurality of compute units:
      executes a single instruction in isolation such that execution of the single instruction is completed before a next instruction is issued; and
      upon an error occurring during execution of any instruction, halts further issuance of instructions and notifies a central processing unit (CPU) that the error has occurred; and
   wherein while a given compute unit executes the single instruction, the accelerated processor inhibits issuance of any instruction by the other compute units of the plurality of compute units until execution of the single instruction by the given compute unit is completed.

2. The computing device of claim 1, wherein executing the single instruction in isolation comprises:
   completing execution of each memory instruction prior to beginning execution of a next instruction.

3. The computing device of claim 1, wherein executing the single instruction in isolation comprises:
   completing execution of each arithmetic logic unit (ALU) instruction prior to beginning execution of a next instruction.

4. The computing device of claim 1, wherein executing the single instruction in isolation comprises:
   completing execution of each memory instruction prior to beginning execution of a next instruction and completing execution of each ALU instruction prior to beginning execution of the next instruction.

5. The computing device of claim 1, wherein the computing device is further configured to select one of the regular mode and the crash-analysis operation mode to execute the application instructions.

6. The computing device of claim 1, wherein each compute unit is configured to halt execution of the application instructions on a condition that an error occurs during execution of the application instructions.

7. The computing device of claim 1, wherein the accelerated processor is further configured to generate and store crash analysis information over time during execution of the application instructions in the crash-analysis operation mode.

8. The computing device of claim 7, wherein the crash analysis information comprises at least one of:
   one or more instructions executed;
   a state of registers local to a compute unit; or
   a state of memory local to the compute unit.

9. The computing device of claim 1, wherein in the crash-analysis operation mode each of the plurality of compute units further:

waits until all dependency counters indicate that the single instruction has fully completed before the next instruction is issued.

10. A method for performing crash analysis for an application, comprising:

prior to dispatching the application, setting a graphics processing unit (GPU) that includes a plurality of compute units to a crash-analysis operation mode;

executing, by a plurality of compute units of the GPU, application instructions in the crash-analysis operation mode by:

executing a single instruction on each respective compute unit in isolation such that execution of the single instruction is completed before a next instruction is issued;

while a given compute unit executes the single instruction, inhibiting issuance of any instruction by the other compute units of the plurality of compute units until execution of the single instruction by the given compute unit is completed, and halting execution of the application upon detection of any error and notifying a central processing unit that the error has occurred.

11. The method of claim 10, wherein executing the single instruction in isolation comprises:

completing execution of each memory instruction prior to beginning execution of the next instruction.

12. The method of claim 10, wherein executing the single instruction in isolation comprises completing execution of each arithmetic-logic-unit (ALU) instruction prior to beginning execution of the next instruction.

13. The method of claim 10, wherein executing the single instruction in isolation comprises:

completing execution of each memory instruction prior to beginning execution of the next instruction and completing execution of each ALU instruction prior to beginning execution of the next instruction.

14. The method of claim 10, further comprising selecting one of the regular mode and the crash-analysis operation mode to execute the application.

15. The method of claim 10, wherein halting execution further comprises stopping issuance of further instructions by the plurality of compute units.

16. The method of claim 10, further comprising generating and storing crash analysis information over time during execution of the application in the crash-analysis operation mode.

17. The method of claim 16, wherein the crash analysis information comprises at least one of:

one or more instructions executed;

a state of registers local to a compute unit; or a state of memory local to the compute unit.

18. The method of claim 16, further comprising at least one of displaying the crash analysis information on a display device or sending the crash analysis information to one or more remote devices over a network.

19. A device for performing crash analysis for an application, the device comprising:

a first processor configured to execute at least a first portion of the application;

a memory storing application instructions for a second portion of the application; and a second processor in communication with the memory, comprising a plurality of compute units, each compute unit configured to execute the application instructions stored in the memory in a regular mode for regular parallel execution of the application instructions; and in a crash-analysis operation mode entered before the application is dispatched, wherein when in the crash-analysis operation mode, each of the plurality of compute units:

executes a single instruction in isolation such that execution of that single instruction is completed before a next instruction is issued; and upon an error occurring during execution of any instruction, halts further issuance of instructions and notifies the first processor that the error has occurred, wherein while a given compute unit executes the single instruction, the device inhibits issuance of any instruction by the other compute units of the plurality of compute units until execution of the single instruction by the given compute unit is completed.

20. The device of claim 19, wherein executing the application instructions in isolation from each other comprises:

completing execution of each memory instruction prior to beginning execution of a next instruction.

* * * * *